United States Patent Office 2,736,536
Patented Feb. 28, 1956

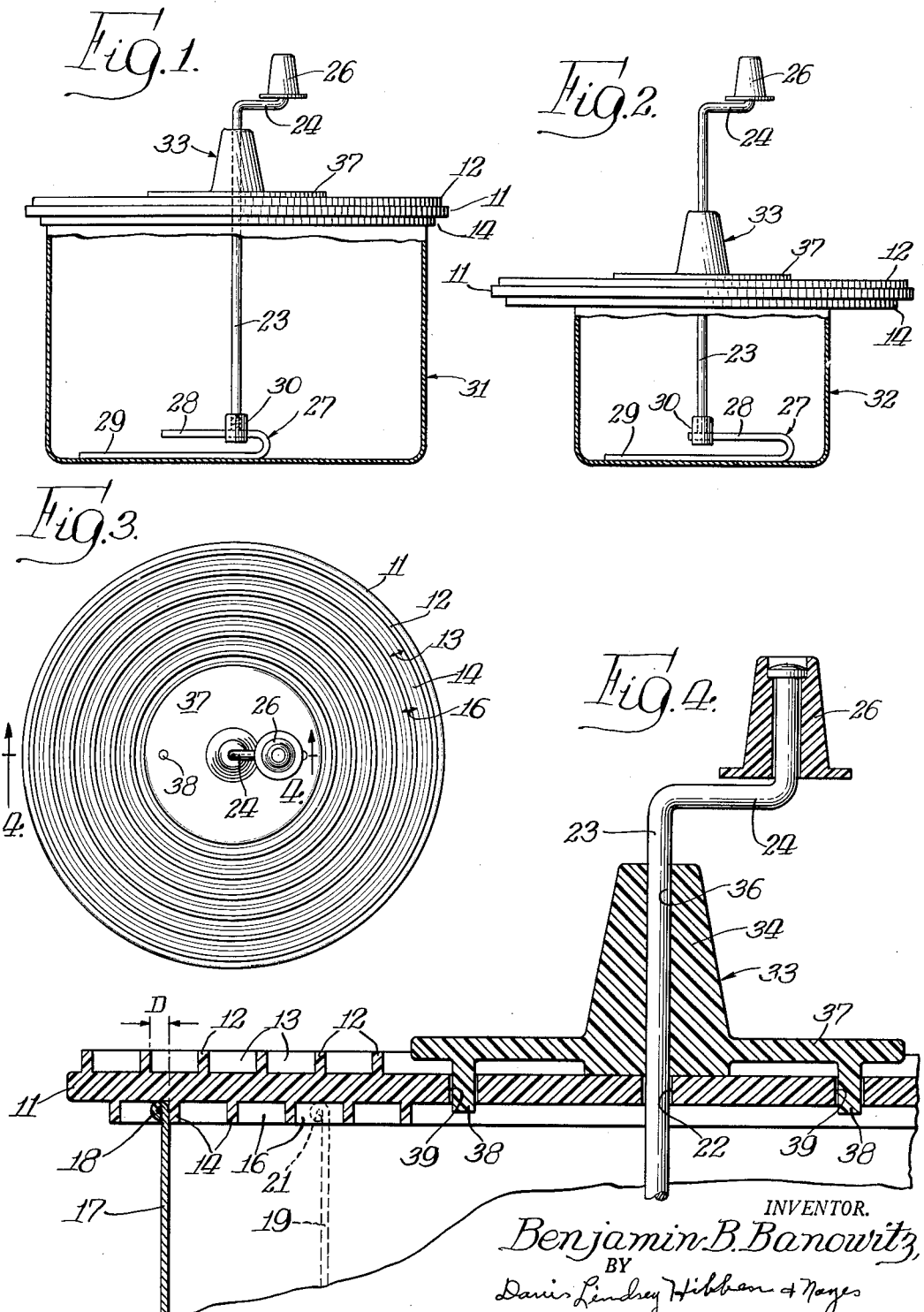

2,736,536

COOKING VESSEL COVER AND AGITATOR

Benjamin B. Banowitz, Chicago, Ill.

Application April 2, 1953, Serial No. 346,467

5 Claims. (Cl. 259—122)

This invention relates to a novel cover or lid construction for cooking vessels and more particularly to a novel combination of a cover and adjustable agitator for such vessels.

There are frequent occasions when an ordinary household cooking or heating operation must be carried out with more or less continuous agitation or stirring. For example, in cooking popcorn, agitation is necessary in order to obtain a uniform product without burning or charring. Likewise in making jelly or candy and in cooking certain cereals, stirring or agitation is required. Although special cooking vessels equipped with agitating or stirring devices are known for such purposes, to my knowledge no simple and inexpensive device capable of being attached to an ordinary household cooking pot or sauce pan has been available heretofore.

Accordingly, a primary object of my invention is to provide novel means for converting an ordinary cooking vessel into an agitator- or stirrer-equipped vessel adapted for use in preparing popcorn, jelly, candy, cereal or like uses.

Another object of the invention is to provide a novel cover or lid adapted to fit ordinary cooking vessels and the like of varying sizes.

A further object of the invention is to provide a novel combination of a cooking vessel lid and a stirrer or agitator.

Still another object of the invention is to provide a novel combined cooking vessel lid and agitator structure which is adapted to be used with an ordinary cooking pot or the like, the lid portion having mounting means for fitting vessels of different sizes and the agitator portion being adjustable to accommodate the different size vessels.

Other objects and advantages of the invention will become apparent from the subsequent detailed description taken in conjunction with the accompanying drawing, wherein:

Fig. 1 is an elevational view, partially in section, showing one specific embodiment of the invention as mounted on a pot of relatively large size;

Fig. 2 is a view similar to Fig. 1 but showing the device mounted on a pot of smaller size;

Fig. 3 is a top plan view of the structure shown in Fig. 1; and

Fig. 4 is a fragmentary sectional view on an enlarged scale as taken along the line 4—4 of Fig. 3.

Referring to the drawing, the lid portion of the invention, which may be used with or without the agitator assembly as will be readily understood, comprises a generally flat circular cover member 11 having a diameter large enough to fit over the largest diameter cooking vessel ordinarily encountered. The disk-like cover member 11 is provided with a plurality of upright concentric circular flanges 12 defining a plurality of annular grooves or channels 13 therebetween. In a similar manner, a plurality of concentric circular flanges 14 depend from the opposite side of the cover member 11 to define a similar set of annular channels or grooves 16 therebetween. As will be readily apparent from Fig. 4, the circular flanges 12 have different diameters from the flanges 14 so that the channels or grooves 13 and 16 on opposite sides of the cover member are arranged in staggered or overlapping relation. It will be seen that this arrangement permits reversible use of the cover member 11 in order to accommodate a wide variety of cooking vessels of different sizes.

In Fig. 4, the wall of a relatively large size cooking vessel is designated at 17 and the circumferential edge of the vessel, in this case a bead or curl 18, is received within the outermost groove or channel 16 for fitting the lid on the vessel. In dotted lines in Fig. 4 the manner of mounting the device on a cooking vessel of smaller size is shown, the vessel wall being designated at 19 and the circumferential bead at the mouth of the vessel being designated at 21. I have found that the disk-like cover member 11 and its integral flange portions 12 and 14 may be conveniently made from a suitable heat-resistant plastic. In the case of a popcorn cooker, the material is preferably a clear transparent plastic in order to permit observation of the contents of the vessel during the cooking operation.

In order to facilitate reversible use of the lid for fitting many sizes of cooking vessels, it is quite important that the diameters and thicknesses of the flanges on each side of the cover member be correlated or chosen so that if a particular groove 16 on one side of the cover does not quite fit over the edge of a given vessel, then the next larger or smaller groove 13 (as the case may be) on the opposite side of the cover will fit the vessel. To insure this result I make the radial distance (designated at D in Fig. 4) between oppositely extending flanges greater than the largest wall or edge thickness which is likely to be encountered at the opening or mouth of any cooking vessel. Thus, in Fig. 4 it will be evident that the distance D is greater than the maximum width or thickness of the bead 18 on the cooking vessel wall 17. Consequently, if a vessel had only a slightly smaller mouth opening than the vessel 17 in Fig. 4 such that it could not fit into either the outermost groove 16 or the next adjacent groove 16 of the cover 11, then it will be seen that by reversing the cover 11 a proper fit can definitely be obtained in the groove 13 of intermediate size at the opposite side of the cover 11. However, if the distance D in this case were not greater than the width of the vessel bead 18, it will be understood that the cover would likewise fail to fit the vessel even when reversed. Accordingly, the distance D is quite critical in my device in relation to obtaining maximum utility of the lid in fitting all sizes of cooking vessels.

The disk-like cover member 11 has a central aperture 22, and an agitator or stirrer assembly is mounted on the cover member including an elongated shaft portion 23 extending axially and slidably through the aperture 22. A bent crank portion 24 is provided at one end of the shaft 23 with a handle member or knob 26 loosely mounted at the outer extremity thereof. The shaft 23 is preferably of metal and the knob 26 may be of wood or plastic in order to minimize the conduction of heat. As seen in Figs. 1 and 2, the lower end of shaft 23 has secured thereon a radially adjustable agitator 27 in the form of a reversely bent arm having a short portion 28 and a longer portion 29. The agitator 27 is adjustably and detachably secured to the shaft 23 by means of a tubular fastener 30 threaded to the lower end of the shaft 23. A transverse diametric bore or aperture extends through the fastener 30 and intersects the threaded bore which receives the shaft 23. The short portion 28 of the agitator arm 27 is slidable radially in the transverse bore of the fastener 30 and may be secured in any desired radially adjusted position merely by tightening the fastener 30 at its threaded connection with the shaft 23 so that the lower end of the shaft 23 is forced into tight retaining engagement with the short arm portion 28.

As seen in Figs. 1 and 2, the stirrer or agitator assembly is freely slidable axially of the cover member 11 so that the longer arm portion 29 of the agitator 27 rests on the bottom of the cooking vessel and is caused to sweep around the interior of the vessel upon rotation of the stirrer by the handle portion 26. In Fig. 1 the device is mounted on a vessel 31 of relatively large size having a relatively large depth and diameter. Thus, only a relatively small portion of the shaft 23 extends above the cover 11 and the arm 27 is adjusted for approximately its maximum radial extent from the shaft 23. In Fig. 2, however, the device is shown as mounted on a vessel 32 of smaller size having a lesser depth and a lesser diameter. Accordingly, a much greater portion of the center shaft 23 projects above the cover 11 and the agitator arm 27 has been adjusted to a lesser degree of radial extent from the shaft 23. Inasmuch as the fastener 30 and the agitator arm 27 are completely detachable from the shaft 23, it will be readily understood that the device can be completely separated from the cover 11 and reassembled in the opposite fashion for reverse mounting of the cover 11.

Inasmuch as the aperture 22 in the cover 11 is somewhat larger than the shaft 23 in order to provide the desired loose sliding fit therebetween, I prefer to use a supplementary shaft support for stabilizing and rotatably holding the shaft 23 in upright position. For this purpose, I provide a one-piece shaft support 33 shown as made from plastic material and having an elongated bearing portion 34 with a central bore 36 adapted to be aligned with the aperture 22 for rotatably receiving the shaft 23. The lower end of the bearing portion 34 rests on the cover member 11 adjacent the center thereof. A radially extending circular flange 37 integral with the bearing portion 34 is provided adjacent the base of the shaft support 33 for overlying the central portion of the disk-like cover member 11. This flange 37 serves as a guard or protective member so that during use the operator may grasp the bearing portion 34 of the shaft support with one hand while rotating the handle 26 with the other hand. In this position, the guard flange 37 provides a support for the hand of the user and prevents contact with the center of the cover member 11 which may become quite hot during the cooking operation. Inasmuch as the flange 37 is spaced slightly above the cover member 11, it will be understood that the flange 37 will remain relatively cool.

In order to prevent relative rotation of the shaft support 33 while operating the agitator, I preferably provide disengageable abutment means between the shaft support 33 and the cover member 11. In this case, the abutment means comprises a plurality of integral pins or lugs 38 which depend from the flange 37 and extend through enlarged apertures 39 in the cover member 11. Since the shaft support 33 is readily detachable from the cover member 11 and also from the agitator assembly, it will be evident that the shaft support 33 can likewise be readily mounted on either side of the cover member 11 for reversible use of the latter.

From the above description it will be seen that my invention provides a relatively inexpensive and simple device capable of use with cooking vessels of varying sizes without the necessity of complicated adjustable fastening means. By using the concentric groove principle on both sides of the cover member, my device is both automatically self-centering and also reversible in order to accommodate a wide variety of cooking vessel sizes. It will also be understood that the vertical and radial adjustability of the agitator assembly cooperates with the variable mounting means for the lid portion of the device in order to accommodate quite simply the variations in vessel depth and diameter.

If desired, the cover member 11 may be used separately as a lid without the agitator or stirrer assembly. In this event, the central aperture 22 may be fitted with a handle or knob in the usual manner. In normal use, the annular edge or bead of the pot will be received within one of the circular grooves 13 or 16 of the cover member, as seen in Fig. 4, so that the opening of the vessel is substantially sealed by the lid. However, if desired, the lid may be so mounted on the cooking vessel that the circular channels are slightly off-center with respect to the axis of the vessel and the lower ends of the depending flanges 12 or 14 rest on the upper edges of the vessel. In this manner of mounting, the pot or vessel is completely covered yet there is ample clearance to permit the escape of steam or cooking vapors.

Although the invention has been described in connection with a particular structural embodiment thereof, it will be understood that various modifications and equivalent structures may be resorted to without departing from the scope of the invention as defined in the appended claims.

I claim:

1. A combined lid and agitator structure for cooking vessels or the like comprising a generally flat cover member having a plurality of concentric circular grooves on opposite sides thereof for receiving the circumferential edges of cooking vessels of different sizes, the groove diameters on one side of said cover member being different from and interposed between the groove diameters on the other side of said cover member whereby the grooves on opposite sides of said cover member are staggered radially so that the cover member is reversible for fitting the cover member on vessels of different sizes, a rotatable member extending through said cover member in detachable journalled relation therewith and freely slidable axially of said cover member, handle means at one end of said rotatable member for operating the same, and a radially adjustable agitator member detachably carried by and extending outwardly from said rotatable member adjacent the opposite end thereof and adapted to rest on the bottom of the cooking vessel for sweeping rotation during operation of the handle means, the axial slidability of said rotatable member permitting automatic accommodation of the agitator structure to vessels of varying depth and the detachability of said rotatable member and said agitator member permitting assembly of the agitator means on either side of said cover member for reversible use thereof.

2. A combined lid and agitator structure for cooking vessels or the like comprising a generally flat cover member having a plurality of concentric circular grooves on opposite sides thereof for receiving the circumferential edges of cooking vessels of different sizes, the groove diameters on one side of said cover member being different from and interposed between the groove diameters on the other side of said cover member whereby the grooves on opposite sides of said cover member are staggered radially so that the cover member is reversible for fitting the cover member on vessels of different sizes, an agitator assembly mounted on said cover member and including an axially extending rotatable shaft with handle means at one end thereof and detachable agitating means at the other end thereof whereby said assembly can be mounted with said agitating means on either side of said cover member for reversible use thereof, and a detachable shaft support carried on said cover member for journaling said shaft, said support being detachable from and mountable on either side of said cover member for reversible use thereof.

3. The structure of claim 2 further characterized in that the radial distance between each of said flange portions on said one side of the cover member and the next adjacent flange portions at the opposite side of said cover member is greater than the maximum edge thickness of said vessels whereby to insure that the lid will fit all possible gradations in size of cooking vessels.

4. A combined lid and agitator structure for cooking vessels or the like comprising a generally flat cover member having a plurality of concentric circular grooves on opposite sides thereof for receiving the circumferential edges of cooking vessels of different sizes, the groove diameters on one side of said cover member being different from the groove diameters on the opposite side of said cover member whereby said cover member is reversible for fitting a plurality of vessels of different sizes, an agitator device mounted on said cover and including an axially extending shaft with handle means at one end and detachable agitator means at the other end whereby said device can be assembled with said agitator means on either side of said cover member for reversible use thereof, and a detachable shaft support comprising an elongated bearing portion for rotatably supporting said shaft and a protective flange extending outwardly from said bearing portion adjacent said cover member for receiving and protecting the hand of the user during operation of the agitator means, said support being detachable from and mountable on either side of said cover member for reversible use thereof.

5. The structure of claim 4 further characterized in that said flange portion of said shaft support and said cover member are provided with coacting abutment means for preventing rotation of said shaft support.

References Cited in the file of this patent

UNITED STATES PATENTS

| | | |
|---|---|---|
| 2,185,878 | Adams et al. | Jan. 2, 1940 |
| 2,286,913 | Kelly et al. | June 16, 1942 |
| 2,505,967 | Humphery | May 2, 1950 |

FOREIGN PATENTS

| | | |
|---|---|---|
| 234,607 | Great Britain | June 4, 1925 |